(12) United States Patent
Kobayashi et al.

(10) Patent No.: US 7,094,290 B2
(45) Date of Patent: Aug. 22, 2006

(54) LIGHT GUIDING PLATE MANUFACTURING APPARATUS AND LIGHT GUIDING PLATE MANUFACTURING METHOD

(75) Inventors: Kazuo Kobayashi, Chiba (JP); Kazuhiko Nakano, Tokyo (JP); Kunisato Kafuku, Chiba (JP); Hidetaka Kaburagi, Tochigi (JP)

(73) Assignee: Columbia Digital Media, Inc., Kawasaki (JP)

( * ) Notice: Subject to any disclaimer, the term of this patent is extended or adjusted under 35 U.S.C. 154(b) by 0 days.

(21) Appl. No.: 10/819,989

(22) Filed: Apr. 8, 2004

(65) Prior Publication Data

US 2004/0259003 A1   Dec. 23, 2004

Related U.S. Application Data

(62) Division of application No. 10/086,835, filed on Mar. 4, 2002, now Pat. No. 6,818,157.

(30) Foreign Application Priority Data

Mar. 7, 2001   (JP)   ............................. 2001-063845

(51) Int. Cl.
*B05C 11/02* (2006.01)
*B29C 53/16* (2006.01)

(52) U.S. Cl. .................. 118/110; 118/212; 118/244; 425/326.1; 425/363

(58) Field of Classification Search ............. 264/1.6, 264/2.7, 284, 110, 175; 425/326.1, 363, 425/385, 174, 328, 374; 359/454, 455, 463; 427/162, 163.1, 163.3, 510, 278; 118/212, 118/110, 244, 258; 156/200, 209, 232, 219; 492/28, 30, 39, 48; 101/382–389

See application file for complete search history.

(56) References Cited

U.S. PATENT DOCUMENTS

| | | | | |
|---|---|---|---|---|
| 4,143,597 A | * | 3/1979 | Kesten et al. ............... | 101/378 |
| 4,193,178 A | * | 3/1980 | McArthur et al. ........... | 492/49 |
| 5,776,636 A | | 7/1998 | Kunisawa et al. | |
| 5,874,132 A | * | 2/1999 | Jung .......................... | 427/278 |
| 6,074,192 A | * | 6/2000 | Mikkelsen .................. | 425/327 |
| 6,110,401 A | * | 8/2000 | Lee et al. ................... | 264/1.34 |
| 6,199,404 B1 | * | 3/2001 | Kawai et al. ................ | 65/102 |
| 6,267,054 B1 | * | 7/2001 | Lopes ....................... | 101/389.1 |
| 6,482,062 B1 | * | 11/2002 | Yao et al. ..................... | 445/24 |

FOREIGN PATENT DOCUMENTS

| | | |
|---|---|---|
| JP | 9-222514 | 8/1997 |
| JP | 11-147255 | 6/1999 |

* cited by examiner

*Primary Examiner*—Sue A. Purvis
(74) *Attorney, Agent, or Firm*—Dickstein Shapiro LLP

(57) ABSTRACT

A light guiding plate is manufactured with accuracy and at low cost. This invention comprises a cylindrical roller, which has a heater built-in, rotating while fixing a stamper having a dot pattern formed on its surface, substrate fixing means for reciprocating along a lower portion of the cylindrical roller in accordance with rotation of the cylindrical roller as fixing a resin substrate, and pressing means for pressing the stamper, which is fixed to the cylindrical roller, onto a surface of the resin substrate, which is fixed to the substrate fixing means, with a constant pressure.

2 Claims, 7 Drawing Sheets

LIGHT GUIDING PLATE MANUFACTURING APPARATUS AND LIGHT GUIDING PLATE MANUFACTURING METHOD

CROSS-REFERENCE TO RELATED APPLICATION

This application is a divisional of application Ser. No. 10/086,835, filed on Mar. 4, 2002, now U.S. Pat. No. 6,818,157 which is hereby incorporated by reference.

BACKGROUND OF THE INVENTION

The present invention relates to an apparatus for manufacturing a light guiding plate used in a backlight device of a liquid crystal display device and its method.

The so-called edge light type light guiding plate, which lets in light from one side surface (light incident surface) of a transparent plate that is a square plate-like member, and which outputs the incident light from a surface (light output surface), is used in a backlight device of a liquid crystal display device for a word processor, personal computer, thin type television and the like. Such a backlight device is provided with a tubular light source placed on at least one side surface of the light guiding plate, and an element (hereinafter referred to as a "deflection element") placed on a surface (light reflective surface) opposite to the light output surface that outputs light so as to change an angle of light that passes through the light guiding plate or an angle of light that is reflected by the light guiding plate.

Incident light from the light incident surface of the light guiding plate is changed in its direction at the light reflective surface and light output surface and the like, and outputs light from the light output surface. Moreover, light is totally reflected by the light reflective surface and transmits in the light guiding plate. Generally, the density distribution of deflection element and the shape thereof are determined such that luminance of light output from the light output surface becomes uniform at the entire surface of the light output surface.

The aforementioned deflection element can include the following three types ① to ③.

① The surface of light guiding plate is coated with white ink that scatters or reflects light;

② Dot pattern by which light is scattered or reflected is formed on the surface of light guiding plate; and ③ A light diffusion particle is dispersed in the light guiding plate.

The light guiding plate of type ① is manufactured by screen printing and the like. However, when the film thickness of print layer with white ink becomes uneven, distribution occurs in reflective power, so that luminance of light output from the light output surface becomes uneven. Further, if dust in the air is mixed into white ink during a print operation process and adhered onto the print side, light scattering is caused by dust, so that evenness of luminance cannot be obtained. Furthermore, the light guiding plate of type ③ has difficulty in dispersing the light diffusion particle in a base material with high reproducibility in order to attain a predetermined density distribution.

For the above reason, type ② that is, the light guiding plate provided with the dot pattern (hereinafter referred to as "dots"), that is, the deflection element, which scatters and/or reflects light onto the surface, is used as a backlight device of a liquid crystal display device in many cases.

Conventionally, as a method for manufacturing the light guiding plate having dots, the manufacturing method with an injection moulding as disclosed in U.S. Pat. No. 5,776,636 is generally used. However, in the manufacturing method with the injection moulding, there is a problem existing in that the large-size injection moulding machine is needed in accordance with an enlargement of the light guiding plate resulting in rising in the manufacturing cost. Another problem exists in that a relatively long modeling time for pressuring and cooling was required to ensure high transcription rate.

As a method for solving the above problems, attention is focused on a method in which a resin substrate, made of acrylic, polycarbonate, polystyrene, and the like molded in the form of sheet beforehand, is subjected to surface treatment so as to manufacture a light guiding plate. As one example, Japanese Patent Laid-Open No. 11-147255 discloses a method in which the dots are formed onto the substrate of resin surface by a cylindrical roller having a pattern, corresponding to the dots, engraved on the surface so as to manufacture a light guiding plate.

SUMMARY OF THE INVENTION

In the manufacturing method described in Japanese Patent Laid-Open No. 11-147255, the dot pattern is engraved on the surface of the cylindrical roller. However, it is extremely difficult to directly engrave dots, having depths of about several μm to 50 μm, on the cylindrical roller. Further, in order to engrave the dots on the surface of cylindrical roller, the cylindrical roller must be manufactured for each light guiding plate having a different dot pattern, and this increases time required for working the cylindrical roller and rises in the manufacturing cost.

Moreover, in the manufacturing method described in Japanese Patent Laid-Open No. 11-147255, a plurality of mold rollers must be prepared in order to form high density patterns such that adjacent patterns such as three continuous V-trenches are arranged close to each other in a desired form. This increases time required for working these cylindrical rollers and rises in the manufacturing cost.

Furthermore, in the manufacturing method described in Japanese Patent Laid-Open No. 11-147255, the resin substrate conveyed by a conveyer belt is sandwiched between two cylindrical rollers (a mold roller and a support roller) so as to form the dots. However, in some cases, the resin substrate was shifted from a predetermined position (predetermined position to the cylindrical roller) on the conveyer belt by vibration and the like, so that the dot pattern was not formed onto the predetermined position of the resin substrate. In order to solve such a problem, it was needed that the resin substrate and cylindrical roller be positioned correctly.

Generally, the resin substrate has a thickness deviation of more than 100 μm. In the manufacturing method described in Japanese Patent Laid-Open No. 11-147255, since the resin substrate is passed between the mold roller and the support roller with a predetermined distance, making it difficult to form the dot pattern having depths of about several μ to 50 μm without any defect.

An object of the present invention is to provide a light guiding plate manufacturing apparatus and its method that can solve the problems of the above-mentioned prior art and manufacture a light guiding plate, particularly a large-size light guiding plate with accuracy and at low cost.

In order to solve the aforementioned problems, the light guiding plate manufacturing apparatus of the present invention comprises a cylindrical roller, which has a heater built-in, rotating while fixing a stamper having a dot pattern formed on its surface; substrate fixing means for reciprocating along a lower portion of the cylindrical roller in accordance with rotation of the cylindrical roller as fixing a resin substrate; and pressing means for pressing the stamper, which is fixed to the cylindrical roller, onto a surface of the resin substrate, which is fixed to the substrate fixing means, with a constant pressure.

Here, it is preferable that the cylindrical roller be made of the material whose thermal expansion coefficient is higher than that of the stamper fixed to the cylindrical roller.

Moreover, the above-structured light guiding plate manufacturing apparatus may further comprise heating means for heating the resin substrate fixed to the substrate fixing means in advance. When a temperature of deflection under load of the resin substrate fixed to the substrate fixing means is set to T, the heating means may heat the resin substrate to temperature in the range of $(T\pm20)°$ C. and the cylindrical roller may heat the stamper fixed to the cylindrical roller to temperature in the range of from no less than $(T+10)°$ C. to no greater than $(T+30)°$ C.

Moreover, the above-structured light guiding plate manufacturing apparatus may further comprise preheating means for heating a portion close to the surface of the resin substrate to temperature in the range of $(T\pm20)°$ C. before the stamper is pressed by the cylindrical roller.

Still moreover, in order to solve the aforementioned problems, the light guiding plate manufacturing method of the present invention comprises the steps of fixing a stamper, having a dot pattern formed on its surface, by a rotating cylindrical roller made of material whose thermal expansion coefficient is higher than that of the stamper; fixing a resin substrate by substrate fixing means, which reciprocates along a lower portion of the cylindrical roller in accordance with rotation of the cylindrical roller; heating the resin substrate to temperature in the range of $(T\pm20)°$ C. and the stamper to temperature in the range of from no less than $(T+10)°$ C. to no greater than $(T\pm30)°$ C. when a temperature of deflection under load the resin substrate is set to T; and pressing the stamper, which is fixed to the cylindrical roller, onto a surface of the resin substrate, which is fixed to the substrate fixing means, with a constant pressure.

DETAILED DESCRIPTION OF THE PREFERRED EMBODIMENTS

The following will explain an embodiment of the present invention with reference to the drawings accompanying herewith.

Figure 1:
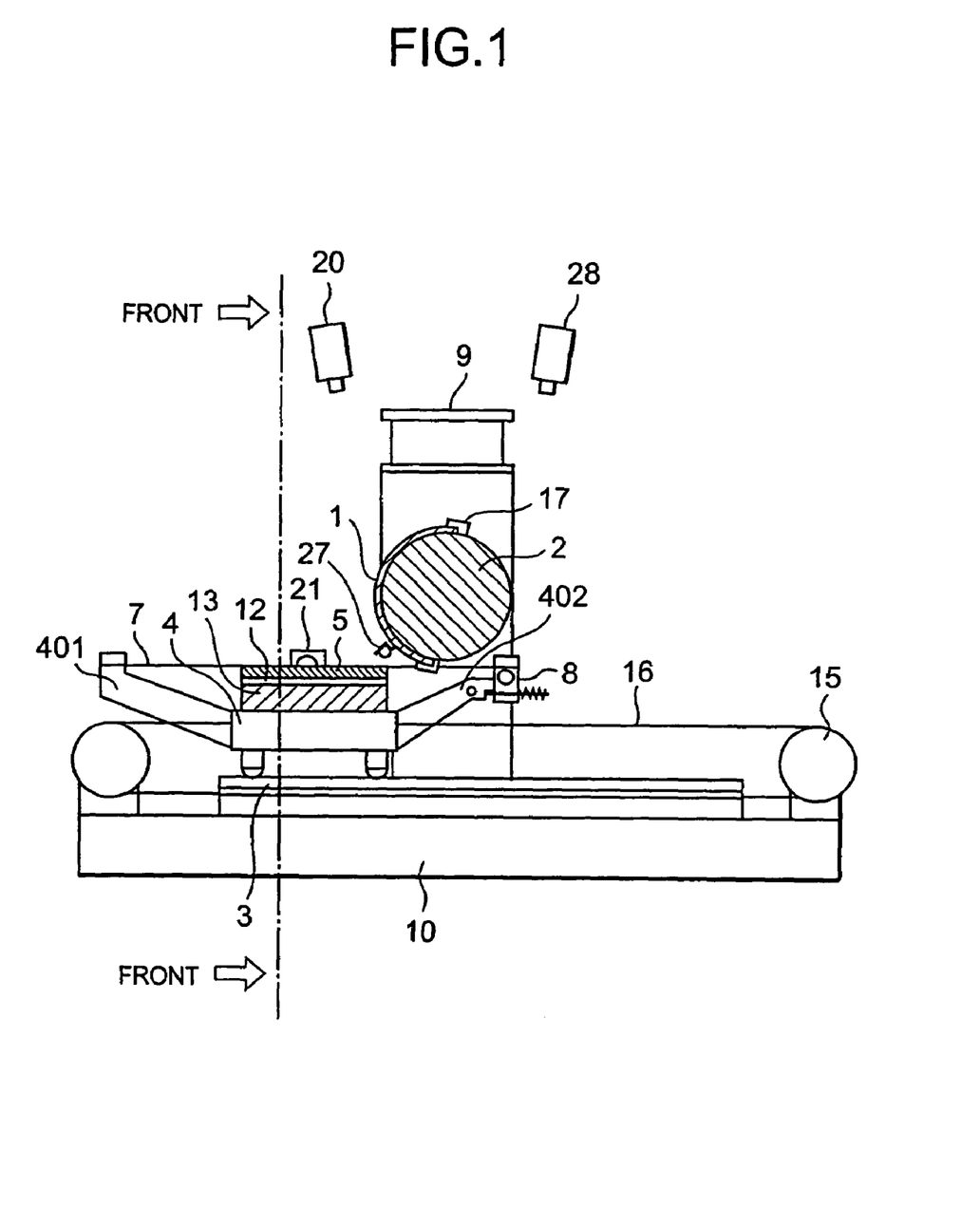
FIG. 1 is a schematic view illustrating a structure of the sectional side of a light guiding plate manufacturing apparatus to which one embodiment of the present invention is applied.
Figure 2:
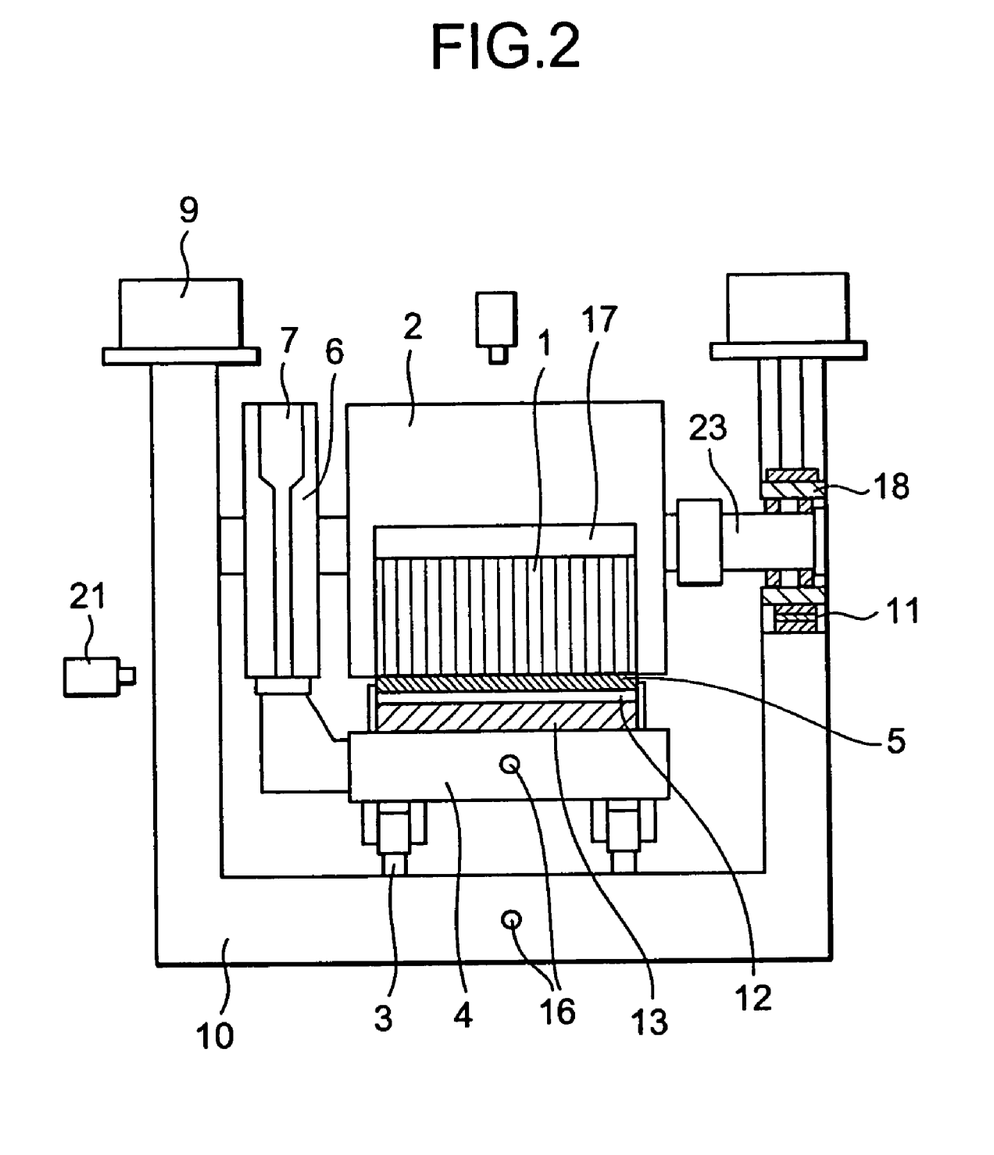
FIG. 2 is a schematic view illustrating a front structure of one embodiment of the light guiding plate manufacturing apparatus illustrated in FIG. 1.
Figure 3:
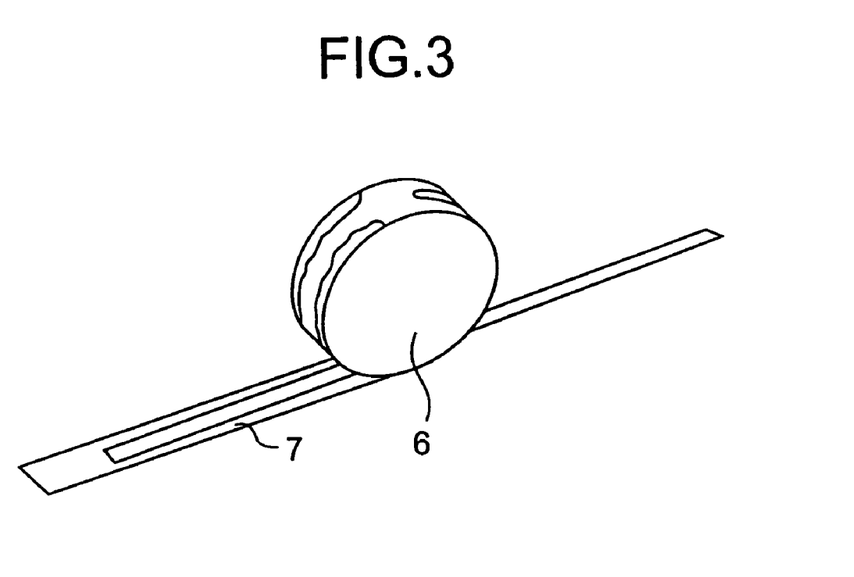
FIG. 3 is a schematic view illustrating a structure of a drum used in the light guiding plate manufacturing apparatus illustrated in FIG. 1.
Figure 4:
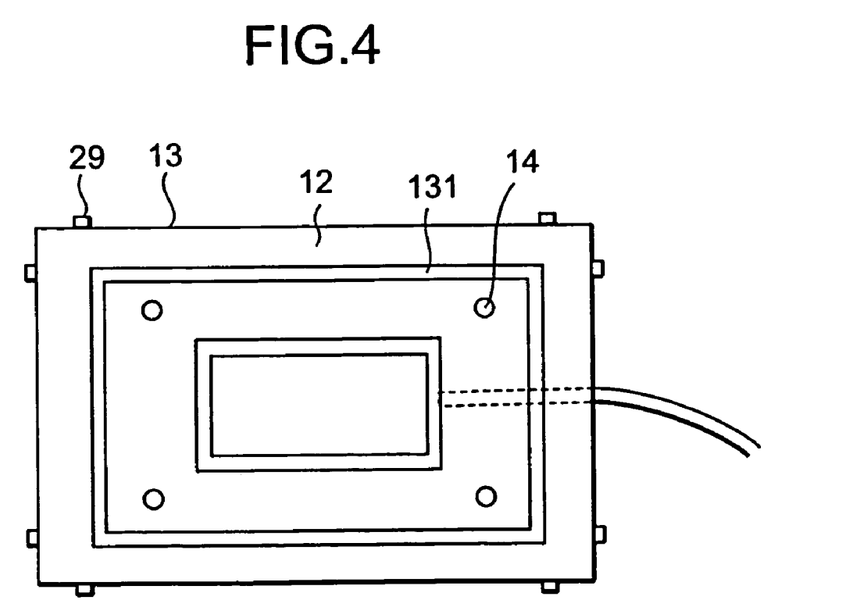
FIG. 4 is a schematic view illustrating an upper surface structure of a carriage used in the light guiding plate manufacturing apparatus illustrated in FIG. 1.
Figure 5:
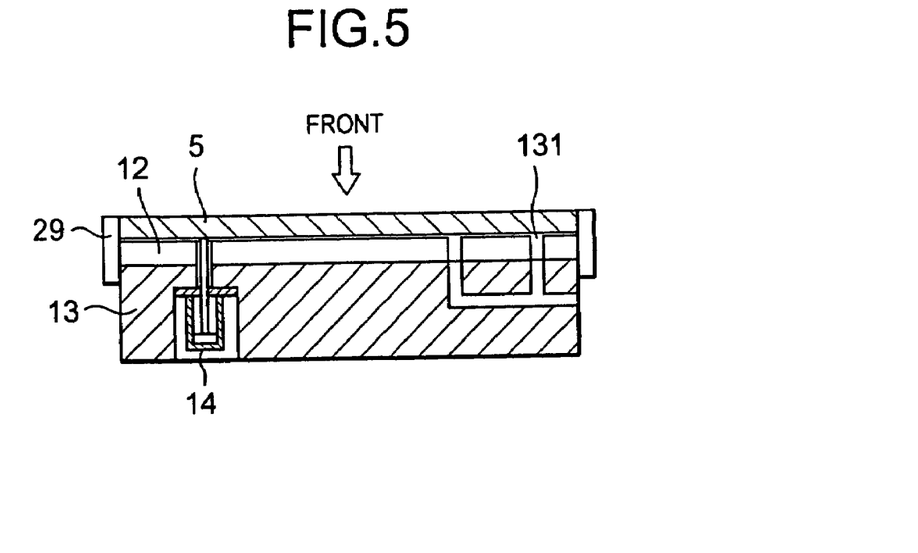
FIG. 5 is a schematic view illustrating a sectional structure of the carriage illustrated in FIG. 4.
Figure 6:
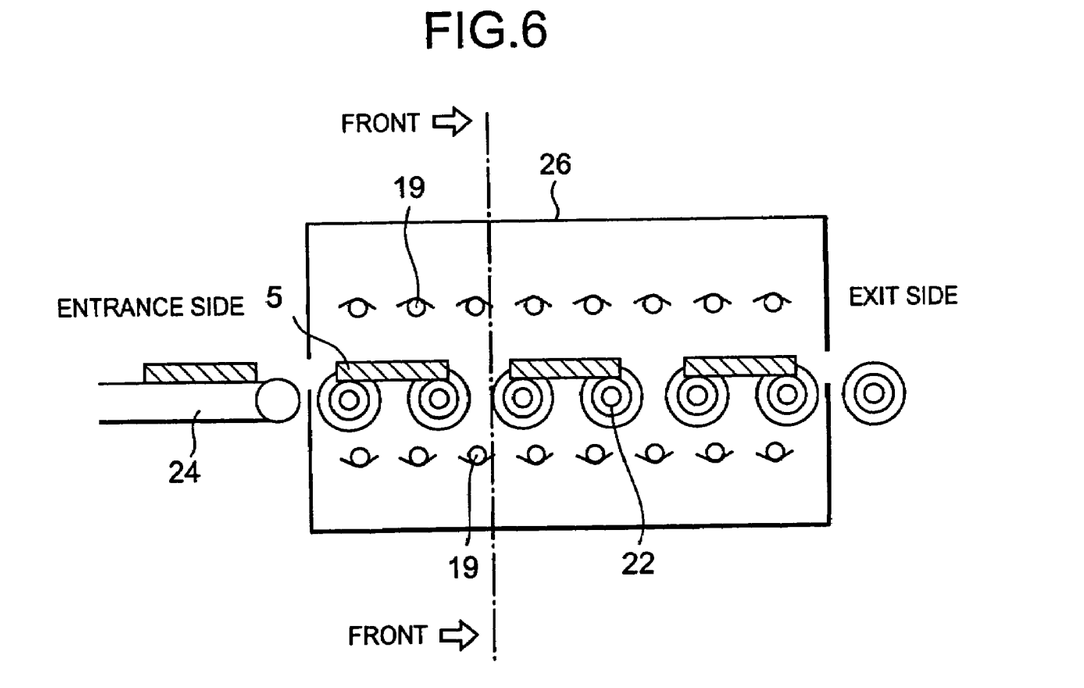
FIG. 6 is a schematic view illustrating a sectional structure of a heating device used in the light guiding plate manufacturing apparatus illustrated in FIG. 1.
Figure 7:
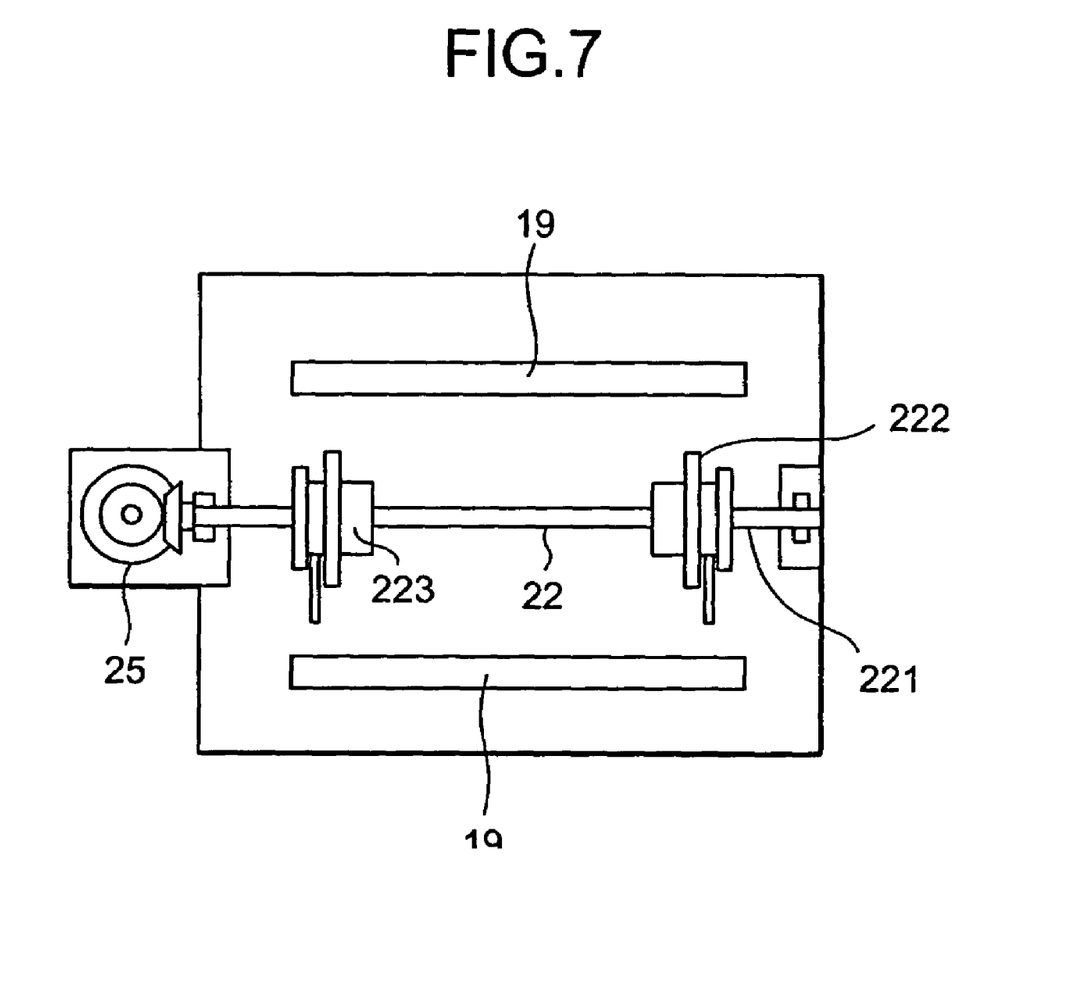
FIG. 7 is a schematic view illustrating a structure seen from the front of the heating device illustrated in FIG. 6.

First, the structure of a light guiding plate manufacturing apparatus to which one embodiment of the present invention is applied will be explained using FIGS. 1 to 7. Herein, FIG. 1 is a schematic view illustrating the structure of the sectional side of the light guiding plate manufacturing apparatus to which one embodiment of the present invention is applied, FIG. 2 is a schematic view illustrating the front structure of the light guiding plate manufacturing apparatus, FIG. 3 is a schematic view illustrating the structure of a drum used in the light guiding plate manufacturing apparatus, FIG. 4 is a schematic view illustrating the upper surface structure of a carriage used in the light guiding plate manufacturing apparatus, FIG. 5 is a schematic view illustrating the sectional structure of carriage illustrated in FIG. 4, FIG. 6 is a schematic view illustrating the sectional structure of a heating device used in the light guiding plate manufacturing apparatus, and FIG. 7 is a schematic view illustrating the structure of the heating device seen from the front.

In FIGS. 1 to 7, reference numeral 1 is a stamper, 2: a cylindrical roller, 3: a rail, 4: a carriage, 401: a first arm, 402: a second arm, 5: a resin substrate, 6: a drum, 7: a belt, 8: a tensioner, 9: an air cylinder, 10: a frame, 11: a shim, 12: an elastic sheet, 13: a base, 131: a vacuum hole, 14: a lift cylinder, 15: a pulley, 16: a rope, 17: a clamp, 18: a bearing case, 19: an infrared heater, 20: a radiation thermometer, 21: a video camera, 22: a wide-variable roller, 221: a rotary shaft, 222: a roller, 223: a placing section, 23: a shaft, 24: a conveying device, 25: a rotary motor, 26: a heat insulating cover, 27: an infrared heater, and 28: a radiation thermometer.

The stamper 1 with a dot pattern has a thickness of about 0.2 to 0.5 mm, and is made by electroforming the surface of a glass original master with a dot pattern by use of nickel. The stamper 1 is fixed in close contact with the cylindrical roller 2 by the clamp 17. The cylindrical roller 2 has an electric heater or a thermocouple and the like built-in, and is structured such that the surface of the cylindrical roller 2 reaches a predetermined temperature.

The cylindrical roller 2 is made of material having a higher thermal expansion coefficient than that of the material of stamper 1. In a case where the stamper 1 is made of nickel, then, aluminum, copper, or an alloy of these materials are used as a material of the cylindrical roller 2. The thermal expansion coefficient of nickel is $13\times10^{-6}$cm/(cm/° C.), while the thermal expansion coefficient of aluminum is around $20\times10^{-6}$cm/(cm/° C.). When the stamper 1, made of nickel, is attached to the cylindrical roller 2, made of aluminum, at room temperature and the cylindrical roller 2 then is heated, the thermal expansion of cylindrical roller 2 is higher than that of stamper 1. As a result, tensile stress is applied onto the stamper 1 and the stamper 1 is fixed in close contact with the cylindrical roller 2.

As illustrated in FIG. 2, the drum 6 is fixed to the cylindrical roller 2 through the shaft 23. Both ends of shaft 23 are rotatably supported by the bearing case 18 placed to be movable up and down inside the frame 10. The cylindrical roller 2 and drum 6 rotate around the shaft 23. The reason that the drum 6 is fixed to the cylindrical roller 2 with the shaft 23 is that deformation of drum 6 due to heat from the heated cylindrical roller 2 is made small. Since the drum 6 and cylindrical roller 2 are fixed to each other with the shaft 23, the cylindrical roller 2 rotates in synchronization with the rotation of drum 6.

As mentioned above, the cylindrical roller 2 has the electric heater or thermocouple and the like built-in, and is controlled such that the surface of cylindrical roller 2 reaches the predetermined temperature. For the reason of the characteristic of the structure, dimensional accuracy at room temperature cannot be always maintained at high temperature. Accordingly, in regard to a final finish grinding work of the cylindrical roller 2 and drum 6, they are worked as being heated at use temperature, making it possible to ensure out-of-roundness, parallelism, and cylindricality.

As illustrated in FIG. 1, the carriage 4, which reciprocates in right and left directions of FIG. 1, is provided at the lower portion of cylindrical roller 2. As illustrated in FIG. 2, the rail 3 is provided at the upper surface of the lower portion of frame 10 to support the carriage 4 to be linearly movable through wheels.

As illustrated in FIG. 3, the belt 7 is wound around the outer periphery of drum 6. The carrier 4 has the first arm 401 at the left of FIG. 1 and the second arm 402 at the right of FIG. 1. One end of belt 7 is fixed to the first arm 401 of the carrier 4, and the other end of belt 7 is fixed to the second arm 402 of carrier 4. For this reason, movement of the carrier 4 is transmitted to the belt 6 via the belt 7. As a result, in FIG. 1, when the carrier 4 moves in the right direction, the cylindrical roller 2 rotates anticlockwise, and when the carrier 4 moves in the left direction, the cylindrical roller 2 rotates clockwise. The tensioner 8 using a spring .is fixed to the second arm 402 of the carrier 4 to prevent the belt 7 from being slacked by the thermal expansion and the like.

The rope 16 is fixed to the carrier 4. The carrier 4 is reciprocated, in the right and left directions in the FIG. 1 by the rope 16 and pulley 15, and the drum 6 and the stamper 1 fixed to the cylindrical roller 2 thereby rotates.

In this figure, though the rope 16, rail 3, and the wheels of the carrier 4 are used, a ball screw, a rack and pinion, a linear motor and the like may be used in place of the rope 16, and a linear guide mechanism using a rolling-element bearing and a sliding guide mechanism may be used in place of the rail 3 and the wheels.

As illustrated in FIGS. 4 and 5, the carrier 4 has the base 13, elastic sheet 12, and claws 29 on its upper surface, and fixes and places the resin substrate 5 through the elastic sheet 12. The resin substrate 5 is positioned on the elastic sheet 12 of the carrier 4 by the plurality of claws 29. The elastic sheet 12 may have preferably such elasticity that the pattern of base 13 is not placed on the rear surface of resin substrate 5 at the time when the resin substrate 5 is pressed by the stamper 1, and also have heat resistance. A silicide rubber, fluoride rubber, and the like can be used. Moreover, the thickness deviation of resin substrate 5 and various kinds of misalignments are absorbed by the elasticity of elastic sheet 12.

The base 13 has the lift cylinder 14 and vacuum hole 131. The lift cylinder 14 has a function of separating the resin substrate 5 from the elastic sheet 12 in order to expel the resin substrate 5 pressed by the stamper 1. The resin substrate 5 is subjected to vacuum chucking through the vacuum hole 131, whereby the resin substrate 5 is fixed onto the elastic sheet 12.

As illustrated in FIG. 2, the shim 11 for adjusting height is formed at the lower side of bearing base 18. The bearing case 18 and shim 11 are controlled to a constant pressure and pressed downward by the air cylinder 9. The thickness of shim 11 is adjusted such that the lower end surface of stamper 1 fixed to the cylindrical roller 2 is placed to be lower than the upper surface of resin substrate 5 by about several tens of μm. This makes it possible to push down of the order of several tens of μm with a fixed pressing force at the time when the resin substrate 5 is pressed by the stamper 1.

FIGS. 6 and 7 are views illustrating the structure of the heating device used in the light guiding plate manufacturing apparatus according to this embodiment. The heating device is a device for heating the resin substrate 5, which is to be supplied to the carrier 4, to a predetermined temperature, and this is located at the left of frame 10 of FIG. 1. The heating device has the heat insulating cover 26 as illustrated in FIGS. 6 and 7.

The plurality of the width-variable rollers 22 is provided inside the heat insulating cover 26. By the rotation of width-variable rollers 22, the resin substrate 5 is moved from an entrance to an exit inside the heating device. The width-variable roller 22 is composed of the rotary shaft 221 and two rollers 222 as illustrated in FIG. 7. Each roller 222 has the placing section 223 inside, and the resin substrate 5 is placed on the placing section 223. Moreover, it is possible to change the distance between two rollers 222 according to the width of resin substrate 5. One end of rotary shaft 221 is engaged with the rotary motor 25, and the rotary shaft 221 is rotated by the rotation of rotary motor 25.

The heating device has the plurality of infrared heaters 19 in the upper and lower positions of width-variable rollers 22 as illustrated in FIG. 6. The infrared heaters 19 heat the resin substrate 5 that is being moved by the width-variable rollers 22. The infrared heaters 19 placed at the upper portion of width-variable rollers 22 are controlled such that the surface temperature of resin substrate 5 reaches T±20° C. of temperature of deflection under load T as described later. Herein, when only the upper surface of resin substrate 5 is heated, a warp occurs since the upper surface of resin substrate 5 differs from the lower surface thereof in the thermal expansion. Accordingly, the lower surface of resin substrate 5 is heated by the infrared heaters 19 placed at the lower portion of the width-variable rollers 22 so as to prevent occurrence of the warp in the resin substrate 5. Herein, since the upper portion of the width-variable rollers 22 differs from the lower portion thereof in the way of heat transfer due to the influence of convective heat, radiant heat and the like, it is preferable that heating temperature of the upper surface of resin substrate 5 and the lower surface thereof be controlled separately by the infrared heaters 19.

In FIG. 1, the infrared heater 27 having a reflector plate at its upper surface is provided at the left lower portion of cylindrical roller 2. The reason that the reflector plate is provided at the upper surface is that the cylindrical roller 2 is prevented from being heated by heat from the infrared heater 27, and that the resin substrate 5 placed on the carriage 4 is heated efficiently.

Moreover, the radiation thermometer 20 and the radiation thermometer 28 are provided at the upper portion of the cylindrical roller 2 as illustrated in FIG. 1. The radiation thermometer 20 measures the surface temperature of the resin substrate 5 positioned at the right than the infrared heater 27 in FIG. 1. The radiation thermometer 28 measures the surface temperature of the resin substrate 5 passed the cylindrical roller 2 (positioned at the left of cylindrical roller 2 in FIG. 1). The infrared heater 27 is controlled in accordance with the temperature measurement results of radiation thermometer 20 and radiation thermometer 28.

Since the moving velocity of carriage 4 is about 1 mm/s to 10 mm/s, the resin substrate 5 heated by the aforementioned heating device is cooled on the carriage 4 while the carriage 4 on which the resin substrate 5 is placed is moving along the lower portion of cylindrical roller 2. As a result, the surface temperature of resin substrate 5 becomes lower than a predetermined temperature in some cases. Accordingly, the radiation thermometer 20 measures the surface temperature of resin substrate 5 before it is pressed by the stamper 1. Then, in a case where the measurement resultant is lower than the predetermined temperature, the resin substrate 5 is heated by the infrared heater 27. Moreover, the radiation thermometer 28 confirms whether or not the resin substrate 5 is heated up to the predetermined temperature.

In the light guiding plate manufacturing apparatus of this embodiment, the video camera 21 is provided at the lefter position than the cylindrical roller 2 in FIG. 1. The video camera 21 shoots the resin substrate 5, which is placed on the carriage 4 and is not subjected to vacuum absorption yet, from its side surface, and detects whether or not a warp occurs in the resin substrate 5. In a case where the warp occurs in the resin substance 5, the infrared heaters 19, which are positioned at the lower portion than the width-variable rollers 22 as illustrated in FIG. 6, are controlled to be adjusted to temperature at which no warp occurs in the resin substance 5.

Figure 8:
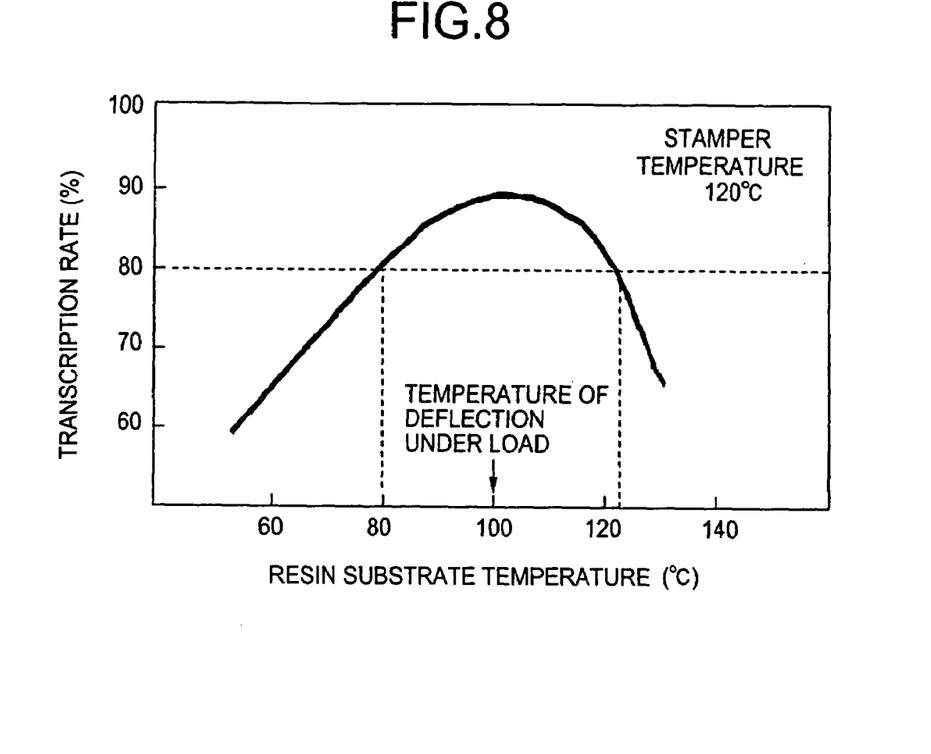
FIG. 8 is a view explaining a transfer rate obtained when a stamper temperature is fixed to 120° C. and a light guiding plate resin temperature is changed so as to form a pattern.

An explanation will be next given of how to add heat to the light guiding plate. FIG. 8 is a view illustrating a transcription rate obtained when a stamper temperature is fixed to 120° C. and a resin temperature is changed so as to form a pattern. As a resin substrate, an acrylic resin having temperature of deflection under load T of 100° C. was used. Herein, the temperature of deflection under load T is temperature at which the amount of load center deflection reaches 0.25 mm in a state that a defined load is applied. Moreover, the transcription rate is one that represents a ratio of the height of pattern of stamper 1 to the height of pattern formed on the resin substrate by percentage. Generally, the transcription rate preferably reaches 80% or more.

In a case where the temperature of resin substrate 5 is low as shown in FIG. 8, the transcription rate does not increase. Even if the temperature of stamper is adjusted, the same result is obtained. In other words, namely, on the resin substrate being left at room temperature, it is impossible to form the pattern with a high transcription rate. If the temperature of resin substrate is increased, the transcription rate reaches 80% or more in the range of from no less than 80° C. to no greater than 120° C. When the temperature reaches more than 120° C., the transcription rate abruptly decreases and this is caused by occurrence of deformation in the deep portion of resin.

Figure 9:
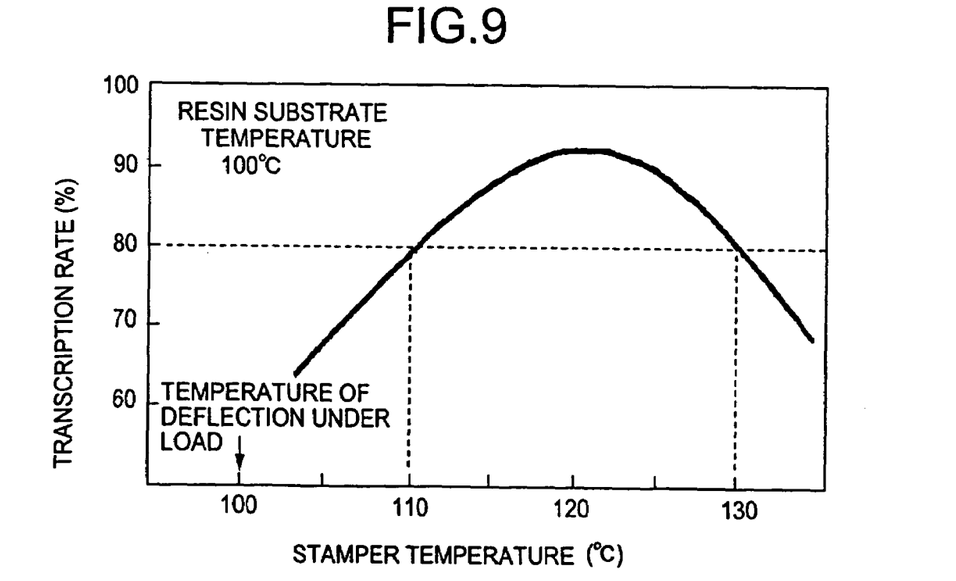
FIG. 9 is a view explaining a transfer rate obtained when a temperature of resin substrate is fixed to 100° C. and the stamper temperature is changed.

FIG. 9 is a view explaining a transcription rate obtained when the temperature of resin substrate is fixed to 100° C. and the stamper temperature is changed. The temperature range where the transcription rate reaches 80% or more is from no less than 110° C. to no greater than 130° C. Accordingly, not only the stamper but also the resin substrate must be heated in advance. As a heating method, there is a method in which heating is directly added using an oven, hot plate and the like, but it is better to use a method in which the resin substrate is irradiated with light having a wavelength whose absorption rate of resin substrate is high. The reason will be described below.

Figure 10:
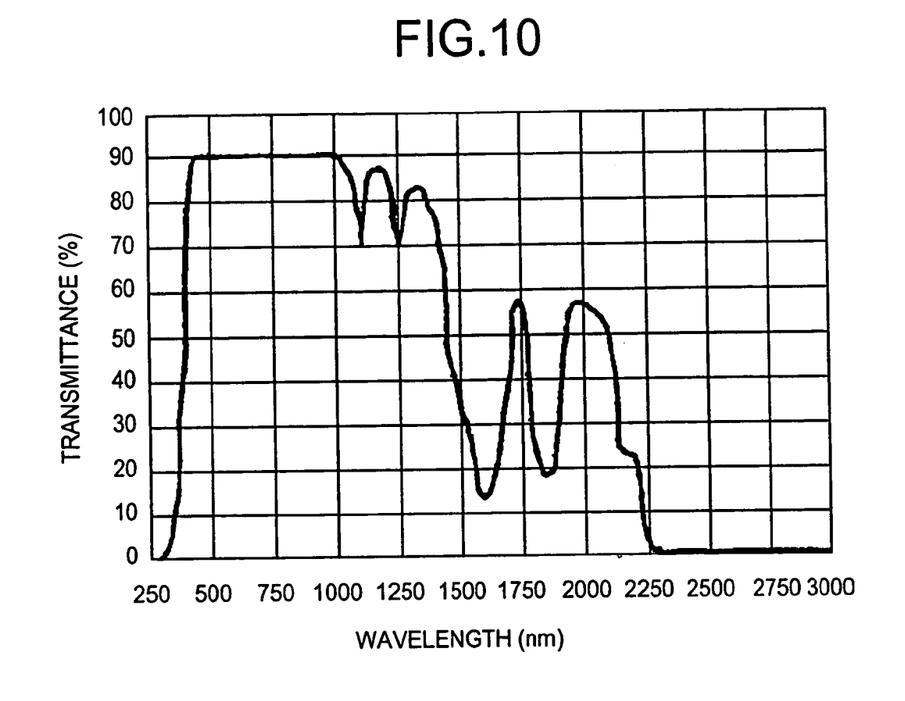
FIG. 10 is a view explaining spectral transmittance of an acrylic resin.
Figure 11:
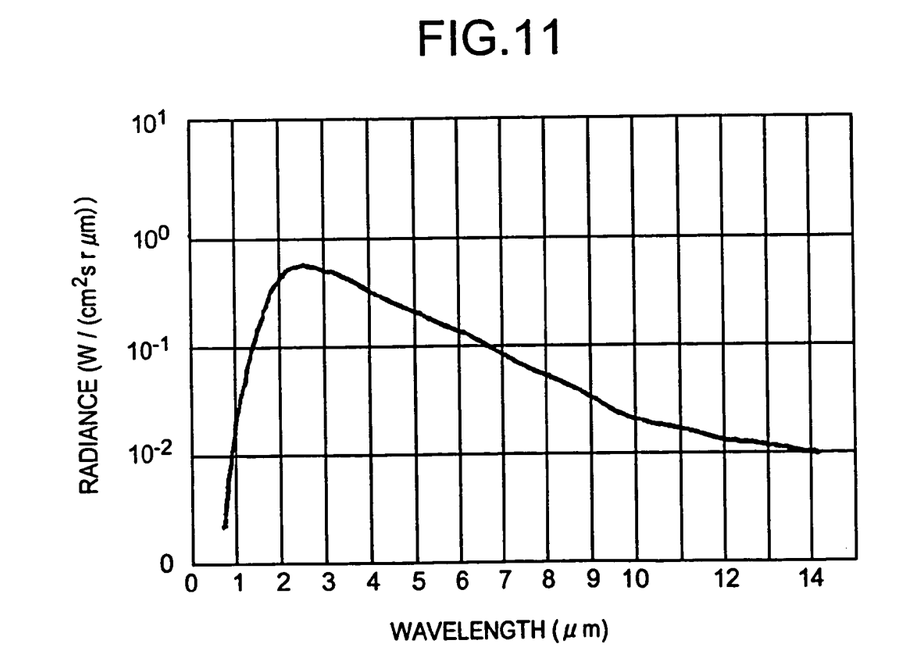
FIG. 11 is a view explaining radiance of a far infrared heater.

FIG. 10 is a view explaining spectral transmittance of an acrylic resin. FIG. 11 is a view explaining radiance of the far infrared heater. From the comparison between two views, it is shown that radiance of the far infrared heater is high in a wavelength region (wavelength region of 2200 nm or more) where transmittance of acrylic resin is low, that is, heating effect is high.

As is obvious from the above, it is preferable that the far infrared heater be used as infrared heater 19 in the heating device illustrated in FIG. 6. Moreover, heating by light irradiation makes it possible to heat only the portion close to the surface. For this reason, the wavelength of irradiation light and power are controlled to make it possible to heat only the portion corresponding to the height of the pattern of stamper. It is also possible to prevent shortage of transcription due to the deformation in resin caused when the temperature of resin substrate reaches more than 120° C. as shown in FIG. 8. Furthermore, any method that does not use the infrared rays may be used as long as it is a method capable of heating the resin. For example, since transmittance of the acrylic resin to ultraviolet light of less than wavelength of 350 nm is low, that is, an absorption rate becomes high, so that ultraviolet light can be used. Generally, though the thermal efficiency of light with a shorter wavelength becomes low, it is possible to heat only the surface portion.

Next, the following will explain the operations of the light guiding plate manufacturing apparatus. First, the resin substrate 5 is conveyed to the inside of the heating device by the conveying device 24 such as a conveyer belt and the like as illustrated in FIG. 6. The conveyed resin substrate 5 is placed on the width-variable rollers 22 of the heating device 26 and heated by the infrared heaters 19 while being moved in the heating device 26. The infrared heaters 19 provided at the upper portion of width-variable rollers 22 heats the resin substrate 5 such that the temperature of the upper surface of resin substrate 5 reaches T±20° C. of the temperature of deflection under load T of resin substrate 5 (T=100° C. in a case where the resin substrate 5 is an acrylic resin). Moreover, the infrared heaters 19 provided at the lower portion of width-variable rollers 22 heats the lower portion of the resin substrate 5 to prevent occurrence of the warp in the resin substrate 5.

The resin substrate 5 heated by the heating device is placed on the elastic sheet 12 of the carriage 4 shown in FIG. 1. At this time, the video camera 21 shown in FIG. 2 detects whether or not the warp is generated in the resin substrate 5. When detecting that the warp is generated in the resin substrate 5, the video camera 21 controls the infrared heaters 19 of heating device and adjusts heating temperature to prevent occurrence of the warp according to the direction of warp and the amount there of.

In the case where the warp occurs in the resin substrate 5 placed on the carriage 4, the resin substrate 5 is removed by the lift cylinder 14 shown in FIG. 5. In the case where no warp occurs in the resin substrate 5 placed on the carriage 4, positioning of resin substrate 5 to the carriage 4 is performed by the claws 29, and the resin substrate 5 is subjected to vacuum chucking through the vacuum hole 131.

When the resin substrate 5 is fixed onto the elastic sheet 12 of the carriage 4, the pulley 15 shown in FIG. 1 rotates. Then, the rope 16 pulls the carriage 4 and starts to move in the right direction of FIG. 1. At this time, the radiation thermometer 20 measures the temperature of the upper surface of resin substrate 5 to detect whether or not the temperature of the upper surface of resin substrate 5 is in the range of T±20° C. of the temperature of deflection under load T of resin substrate 5. In a case where the temperature of the upper surface of resin substrate 5 is lower than the temperature, which is 20° C. or lower than the temperature of deflection under load T of resin substrate 5, the upper surface of the resin substrate 5 is heated by the infrared heater 27.

In accordance with movement of the carriage 4 to the right direction of FIG. 1, the cylindrical roller 2 to which the stamper 1 is fixed rotates. The built-in heater heats the cylindrical roller 2 to temperature, which is 10 to 30° C. higher than the temperature of deflection under load T of resin substrate 5. The cylindrical roller 2 is pressed downward with a fixed pressure by the air cylinder 9 illustrated in FIG. 2. When the resin substrate 5 passes the lower portion of cylindrical roller 2, the stamper 1 is fixed to the position where the entire surface of stamper 1 contacts the entire surface of the upper surface of the resin substrate 5.

In accordance with the movement of the carriage 4 under the lower portion of the cylindrical roller 2 and the rotation of cylindrical roller 2, the upper surface of the resin substrate 5 fixed to the carriage 4 is pressed by the stamper 1 fixed to the cylindrical roller 2. Then, a dot pattern formed on the stamper 1 is transcribed onto the resin substrate 5.

After that, the carriage 4 passes the cylindrical roller 2 while the stamper 1 presses the resin substrate 5. When moving to a predetermined position, the carriage 4 stops and ceases the vacuum chucking of the resin substrate 5, then the resin substrate 5 (light guiding plate) on which the dot pattern is transcribed is removed from the carriage 4 by the lift cylinder 14.

The pulley 15 shown in FIG. 1 rotates, and the carriage 4 from which the resin substrate 5 is removed is pulled by the rope 16, so that the carriage 4 is moved to the left direction of FIG. 1. When moving to the predetermined position, the carriage 4 stops and places thereon a next resin substrate heated by the heating device thereon. The light guiding plate manufacturing apparatus of this embodiment repeats the aforementioned operations, and transfers the dot pattern onto the resin substrate 5.

As mentioned above, according to the light guiding plate manufacturing apparatus of this embodiment, since there is used the method in which the stamper is fixed to the cylindrical roller, only the stamper needs to be changed in manufacturing the light guiding plate whose dot pattern and shape are different. This makes it possible to reduce manufacturing time and manufacturing cost.

According to the light guiding plate manufacturing apparatus of this embodiment, since there is used the method in which the stamper is fixed to the cylindrical roller, it is possible to provide distribution to dot density by one cylindrical roller (since a pattern in which distribution is provided to dot density may be formed on the stamper). Since the number of steps is small as compared with the prior art, there is a low possibility that defects will be generated, and manufacturing time can be shortened.

According to the light guiding plate manufacturing apparatus of this embodiment, since there is used the structure in which the resin substrate is fixed to the carriage to press the stamper, the resin substrate is not shifted from the predetermined position during the manufacturing steps, so that the light guiding plate can be manufactured without any defect.

According to the light guiding plate manufacturing apparatus of this embodiment, since the stamper is pressed to the resin substrate with a fixed pressure, there is a low possibility that transfer failure will occur in accordance with the thickness deviation of resin substrate.

In the embodiment explained above, the dot pattern is formed onto one surface of resin substrate. However, after forming the dot pattern using the light guiding plate manufacturing apparatus of this embodiment, the resin substrate is reversed, and a different pattern such as a prism pattern and the like may be further formed thereon using the light guiding plate manufacturing apparatus of this embodiment.

In this way, according to the present invention, it is possible to provide a light guiding plate manufacturing apparatus and its method that can manufacture a light guiding plate, particularly a large-size light guiding plate with accuracy and at low cost.

What is claimed is:

1. A light guiding plate manufacturing apparatus, which manufactures a light guiding plate, comprising:
a cylindrical roller, which has a heater built-in, rotating while fixing a stamper having a dot pattern formed on its surface;
substrate fixing means which reciprocates at a lower side of said cylindrical roller in accordance with rotation of said cylindrical roller while fixing a resin substrate;
pressing means for pressing with a constant pressure said stamper, which is fixed to said cylindrical roller, onto a surface of said resin substrate, which is fixed to said substrate fixing means; and
heating means for heating in advance said resin substrate fixed to said substrate fixing means, wherein when a temperature of deflection under load of the resin substrate fixed by said substrate fixing means is set to T, said heating means heats said resin substrate to temperature in the range of (T+20)° C. and said stamper, fixed to said cylindrical roller, to temperature in the range of from no less than (T+10)° C. to no greater than (T+30)° C.

2. A light guiding plate manufacturing apparatus, which manufactures a light guiding plate, comprising:
a cylindrical roller, which has a heater built-in, rotating while fixing a stamper having a dot pattern formed on its surface;
substrate fixing means which reciprocates at a lower side of said cylindrical roller in accordance with rotation of said cylindrical roller while fixing a resin substrate;
pressing means for pressing with a constant pressure said stamper, which is fixed to said cylindrical roller, onto a surface of said resin substrate, which is fixed to said substrate fixing means; and
preheating means, wherein when a temperature of deflection under load of the resin substrate fixed by said substrate fixing means is set to T, said preheating means heats, before said stamper is pressed by said cylindrical roller, a vicinity of the surface of said resin substrate to temperature in the range of (T+20)° C.

* * * * *